: 3,367,947
AMIDATION OF 2-HALO-ACETATES
John W. Cornforth, Sittingbourne, Kent, England, assignor to Shell Oil Company, New York, N.Y., a corporation of Delaware
No Drawing. Filed Nov. 30, 1964, Ser. No. 414,896
Claims priority, application Great Britain, Dec. 2, 1963, 47,437/63
14 Claims. (Cl. 260—340.9)

This invention relates to a process for the preparation of 2-monhaloacetoacetamides and to novel intermediates in the said process.

As is taught in U.S. Patent No. 2,802,855, dialkyl phosphate of 3-hydroxycrotonic acids, having the formula:

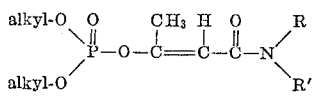

wherein each alkyl contains from 1 to 4 carbon atoms and R and R' each individually represents hydrogen or alkyl of from 1 to 4 carbon atoms, are effective insecticides. As also is taught by the patent, such compounds can be prepared by reacting the appropriate trialkyl phosphite with the appropriate 2-haloacetoacetamide. However, it has been found that in some cases, amides of this class cannot be readily prepared by this route, because a sufficiently pure 2-chloroacetoacetamide cannot be readily prepared. The 2-chloroacetoacetamide precursors customarily are prepared by chlorination of the corresponding acetoacetamides, and in the cases of certain of these acetoacetamides, it has been found virtually impossible to prevent formation of substantial amounts of the corresponding 2,2-dichloroacetoacetamides. Thus, 3 - (dimethoxyphosphinyloxy) - N - methylcrotonamide (R=H, R'=methyl) can be prepared by the reaction of trimethyl phosphite with 2-chloro-N-methylacetoacetamide, which in turn can be prepared by chlorination of N-methylacetoacetamide, but even by the use of the most efficient chlorinating procedure known, the selectivity for the chlorination has not exceeded 85%, and in most cases is at about 80%—that is, the product contains at least 15% and in most cases about 20% of the 2,2-dichloro-N-methylacetoacetamide.

If the product containing the dichloroacetoacetamide is reacted with the trialkyl phosphite to prepare the insecticide, the dichloro amide also reacts, to form the corresponding amide of the dialykyl phosphate of 2-chloro-3-hydroxycrotonic acid, and this is highly undesirable, inasmuch as the chloro-substituted compound generally is inferior as an insecticide to the corresponding non-choloro-substituted compound, and/or has higher mammalian toxicity. Accordingly, and to avoid this result, it is necessary at least that the dichloroamide be removed from the crude chlorination product, or that the chloro-substituted insecticidal compound be removed from its non-chloro-substituted counterpart. Either operation is difficult to accomplish readily, since the corresponding product and by-product in each case have very similar boiling points and other physical characteristics. There is, accordingly, a need for an alternative method for preparing amides of dialkyl phosphates of 3-hydroxycrotonic acid that employs a readily prepared, pure starting material.

A method which will accomplish this from known, readily available, materials now has been discovered, and briefly described comprises the following steps:

(1) An alkyl acetoacetate is selectively halogenated to the corresponding alkyl 2-monohaloacetoacetate;

(2) The alkyl 2-haloacetoacetate is condensed with a vicglycol having at least one hydrogen bonded to each of the carbon atoms that is bonded to hydroxy;

(3) The resulting alkyl 2-halo-2-(2-methyl-1,3-dioxolan-2-yl)acetate is reacted with an amine, which term is intended to include ammonia;

(4) The resulting 2-halo-2-(2-methyl-1,3-dioxolan-2-yl)-acetamide is hydrolyzed to give the desired 2-haloacetoacetamide.

If more convenient, Step 1 can be omitted and the 2-(2-methyl-1,3-dioxolan-2-yl)acetate selectively halogenated to form the corresponding 2-halo derivative, which then is reacted with the amine, per Step 3. The alkyl 2-(2-methyl-1,3-dioxolan-2-yl)acetates are known compounds: E. J. Salmi, Berichte der deutschen chemischen geselschatt, volume 71, 30 page 1803 ff. (1938).

Pure mono-haloamides are readily prepared by this process. Alkyl 2-monohaloacetoacetates, such as the alkyl esters of 2-chloroacetoacetic acid, are known compounds, readily prepared essentially pure by chlorination of the corresponding alkyl esters of acetoacetic acid. Such pure esters are suitable for use in Step 1. When the non-hologenated alkyl acetoacetate is used, and the 2-(2-methyl-1,3-dioxolan-2-yl)acetate is chlorinated, the selectivity continues to be very high, giving essentially only the 2-monohalo derivative.

It is necessary to first condense the acetoacetate with the glycol to change the reactivity of the acetoacetate with amines, for if an alkyl 2-haloacetoacetate is reacted with an amine directly, a substantial proportion of the 2-haloacetoacetate is converted to unwanted by-products, with poor yield of the desired acetoacetamide. The condensation of the acetoacetate with the glycol apparently deactivates other reactive centers—such as the hydrogen atom on the carbon atom in the alpha position relative to the ester moiety, the halogen atom, etc.—so that essentially only amidation occurs.

As has already been indicated, chlorination of the alkyl acetoacetate and the resulting 2-haloacetoacetates, are well known. Consequently, the process of this invention comprises the combination of Steps 2, 3 and 4, and the variation thereof wherein the 2-(2-methyl-1,3-dioxolan-2-yl)acetate is formed and then chlorinated. The 2-chloro-2-(2-methyl-1,3-dioxolan-2-yl)acetates, and the corresponding amides, are novel, and form one aspect of the invention.

In the method, and in the esters and amides, of this invention, the halogen involved preferably is middle halogen—that is, bromine or chlorine—with chlorine being preferred because of the lower cost of the halogenating agents that are available for use.

Described in schematic terms, Step 2 comprises the reaction represented by the equation:

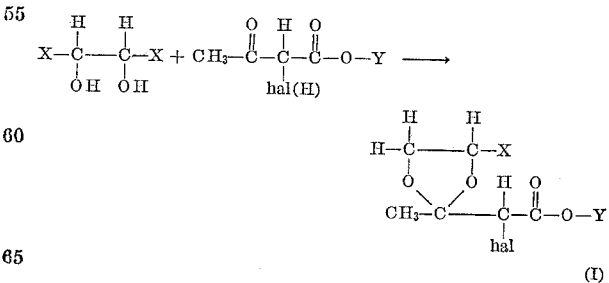

wherein X represents hydrogen or alkyl of from 1 to 10, preferably 1 to 4, carbon atoms, Y represents alkyl of from 1 to 10, preferably 1 to 4, carbon atoms and hal represents middle halogen. Most preferably each X represents hydrogen or methyl, and Y represents methyl or ethyl.

Step 3 comprises the reaction represented by the equation:

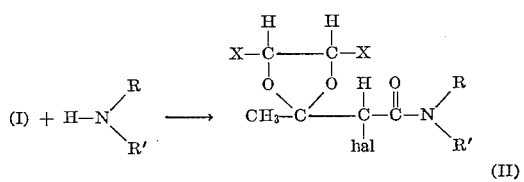

wherein each of the symbols has the respective meaning already set out.

Step 4 comprises the reaction represented by the equation:

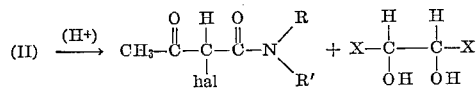

wherein the symbols have the respective meanings already set out.

The modification wherein the unhalogenated acetoacetate is used and the intermediate 2-(2-methyl-1,3-dioxolan-2-yl)actate is halogenated is indicated by the hydrogen and halogen indicated in parentheses.

Compounds of Formulas I and II are novel.

It will be noted that the glycol used as starting material is regenerated in the hydrolysis step, thus conserving this reactant.

Condensation of the glycol with the acetoacetate is a conventional cyclic ketalization reaction in which the two reactants are mixed in the presence of a strong non-oxidizing acid as catalyst, a suitable solvent being included, and the reaction being conducted at a moderately elevated temperature, and water of reaction being removed as it is formed. The reaction suitably may be conducted at atmospheric pressure and a temperature above the boiling point of water—say, 100° C. to about 200° C. Lower temperatures can be used if appropriate reduction in the system pressure is effected. Suitable acid catalysts include aromatic sulfonic acids, such as p-toluenesulfonic acid, lower alkanesulfonic acids, dry hydrogen chloride, sulfuric acid, or the like. Suitable solvents include the aromatic hydrocarbons of appropriate boiling point.

The reaction between the amine and the ester (I) is suitably carried out at a temperature in the range 0° to 150° C., for example room temperature. Further, the reaction is conveniently effected in the presence of an inert reaction medium, the nature of which will depend on the amine used, for example water is suitable for ammonia and ethanol suitable for methylamine.

The hydrolysis of the amide (I) formed by reaction of the ester with the amine must be carried out under conditions which favour the removal of the oxygen-containing group attached to carbon atom 3 but cause no substantially hydrolysis of the amide grouping. Dilute aqueous acidic conditions achieve such a result; the acid may be inorganic or organic but preferably is a mineral acid, e.g. hydrochloric or sulphuric acid. The speed of hydrolysis will, in the main, be dependent on the reaction temperature, suitable reaction rates being obtainable at temperature in the range 50° to 120° C. Gentle boiling or refluxing of the hydrolysis mixture, giving rise to reaction temperatures of the order of 100° C., generally give the best results.

Where the 2-(2-methyl-1,3-dioxolan-2-yl)acetate is to be halogenated, such can be accomplished by treating it with a halogenating agent in the presence of a suitable liquid medium. Suitable halogenating agents include chlorine, bromine, thionyl chloride, thionyl bromide, sulfuryl chloride, sulfuryl bromide, and compounds containing "active" or "positive" chlorine or bromine, such as hypochlorous acid, N-chlorourea, N-chloro- and N-bromosuccinimides, hypochlorous acid, hypobromous acid, alkyl hypochlorites and hypobromites, such as t-butyl hypochlorite, and the like, a detailed summary of such halogenating agents being given in copending application Serial No. 338,568, filed January 20, 1964. The suitable reaction medium in a particular case will be based primarily upon the character of the chlorinating agent that is employed. Thus, water is a suitable solvent, particularly where the chlorinating agent is hypochlorous acid (which can be generated in situ by reaction of chlorine with the water), N-chloroamides such as N-chlorourea and the like. Where an alkyl hypochlorite is used as the chlorinating agent, a suitable solvent may be the alcohol having the same alkyl moiety. Suitable solvents for use with most organic hypochlorites, include lower molecular weight alkanes, that are liquid in the reaction mixture under the reaction conditions, for example, pentane, hexane, nonane, decane, isopentane, and the like, aromatic hydrocarbons such as benzene, xylene, toluene, ethylbenzene, and the like, and poly-halogenated lower alkanes that are liquid under the reaction condtiions, including methylene chloride, methylene bromide, chloroform, carbon tetrachloride, methyl bromide, 1,1- and 1,2-dichloroethane, 1,2-dichloroethylene, isopropyl chloride, butyl chloride, sec-butyl chloride, 1,2- and 1,3-dichloropropane, 1,1,2-trichloroethane, and the like. Also suitable are chlorinated aromatic compounds such as chlorobenzene, the dichloro- and trichlorobenzenes and the like. It is to be noted that even when a non-aqueous medium is employed, it may be desirable to include in the reaction mixture trace to minor amounts of water—for example, up to 1 mole of water per mole of the acid reactant.

When water is present in the reaction mixture, it is desirable that the reaction mixture not be basic, but that it be at least neutral and preferably acid. If a halous acid is to be generated from a metallic halite, such as the calcium or sodium hypochlorite, precaution must be taken to insure that the solution is initially—before halogenation is begun—neutral to slightly acid.

Even when water is not present in the reaction mixture, use of basic halogenating agents should be avoided. Thus where a chlorinating agent such as pyridine dichloride is used, it preferably is used in the form of its hydrogen chloride salt.

Ordinarily, it will be found most convenient to remove by-product hydrogen halide after the reaction is complete, by heating the mixture to drive off the hydrogen halide. If a suitable solvent, such as di-, tri- or tetrachloromethane, is used, hydrogen halide can be removed by refluxing the reaction mixture. It may be found desirable to afterward treat the resulting mixture with a mild base, such as sodium bicarbonate, to remove any traces of hydrogen halide still remaining therein. The desired product can be recovered by distilling the hydrogen halide-free mixture to remove the medium, and redistilling the bottoms product, if necessary, to remove any heavy ends that may have been formed. To avoid decomposition of the product, it is preferable to employ reduced pressure distillation techniques.

The halogenation is conducted by reacting the ester with substantially an equal number of moles of the halogenating agent, preferably at a temperature not exceeding about 60° C. and preferably below about 40° C. It is preferred not to employ temperatures below about 0° C. A moderate excess of the halogenating agent—say, up to about 1.2 to 1.5 moles per mole of ester—may be used in some cases to insure complete reaction.

In the process of the invention, it is preferred that the glycol used be ethylene glycol or propylene glycol, with the former being of most usefulness.

The process of the invention is particularly useful in the preparation of the following compounds:

2-chloro-acetoacetamide,
N-methyl-2-chloro-acetoacetamide,
N,N-dimethyl-2-chloro-acetoacetamide and
N,N-diethyl-2-chloro-acetoacetamide.

These compounds are convenient starting materials in the production of the corresponding organophosphorus insecticides, which are of most interest. Accordingly a preferred process of the invention comprises the preparation of 2-chloro-acetoacetamides coming within the general formula:

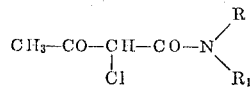

wherein R and $R_1$ each represents a hydrogen atom or a methyl or ethyl group.

The invention is further illustrated by the examples that follow. Parts by weight (p.b.w.) and parts by volume (p.b.v.) bear the same relation as the kilogram does to the litre.

EXAMPLE I (A) *Preparation of ethyl 2-chloro-2-(2-methyl-1,3-dioxolan-2-yl)-acetate.*—Ethyl 2-chloroacetoacetate (16.5 p.b.w), ethylene glycol (6.5 p.b.v.), toluene-p-sulphonic acid (0.055 p.b.w.) and toluene (20 p.b.v.) were boiled under a Dean-Stark water-separator until water no longer condensed. The mixture was washed with aqueous sodium hydrogen carbonate, dried over magnesium sulphate, and fractionally distilled at low pressure to give the product (16 p.b.w.) as a colourless oil, B.P. 121°–123° C./11 torr, index of refraction ($n_D^{20}$) 1.4518.

Analysis (percent by weight). — Calculated for $C_8H_{13}O_4Cl$: C, 46.0; H, 6.2; Cl, 17.0. Found: C, 45.6; H, 6.2; Cl, 17.3.

(B) *Preparation of N-methyl-2-chloro-2-(2-methyl-1,3-dioxolan-2-yl)acetamide.* — Ethyl 2-chloro-2-(2-methyl-1,3-dioxolan-2-yl)acetate (4.17 p.b.w.) and 33% (by weight) ethanolic methylamine (5.4 p.b.w.) were mixed at room temperature. After 88 hours the mixture was evaporated at low pressure and room temperature. The residue was dissolved in a little water, acidified slightly by addition of hydrochloric acid, saturated with sodium chlorde and extracted twice with ethyl acetate. The extract was concentrated, ether was added and the solution was chilled. The product, a white crystalline solid (3.0 p.b.w.) was collected; it had M.P. 76°–77° C.

Anaylsis (percent by weight).—Calculated for $C_7H_{12}O_3NCl$: C, 43.4; H, 6.2; N, 7.2; Cl, 18.4. Found: C, 43.3; H, 6.4; N, 7.3; Cl, 18.5.

(C) *Hydrolysis of the 1,3-dioxolan-2-yl group.*—N-methyl - 2 - chloro-2-(2-methyl-1,3 - dioxolan-2-yl)acetamide (0.5 p.b.w.) was dissolved by warming with 1.25 N hydrochloric acid (0.5 p.b.v.). The mixture was saturated with sodium chloride and boiled gently for 15 minutes. The solution was cooled, sufficient water was added to dissolve some sodium chloride which had separated, and the solution was extracted three times with ether. Evaporation of the ether left a crystalline solid (0.39 p.b.w.) M.P. 67°–75° C. This was purified by recrystallisation from ether or carbon tetrachloride and formed white flattened needles, M.P. 80°–81° C.

Analysis (percent by weight).—Calculated for $C_5H_8O_2NCl$: C, 40.1; H, 5.4; N, 9.4; Cl, 23.7. Found: C, 40.1; H, 5.4; N, 9.6; Cl, 23.7.

EXAMPLE II

*Preparation of 2-chloro-2-(2-methyl-1,3-dioxolan-2-yl) acetamide.*—This compound was prepared by covering ethyl 2-chloro-2-(2-methyl-1,3-dioxolan-2-yl)acetate with aqueous ammonia (density: 0.88) and leaving for 24 hours. White blade-like crystals were collected; these melted at 152°–153° C.

Analysis (percent by weight).—Calculated for $C_6H_{10}O_3NCl$: C, 40.0; H, 5.6; N, 7.8; Cl, 19.8. Found: C, 39.9; H, 5.7; N, 7.6; Cl, 20.0.

EXAMPLE III

*Preparation of ethyl 2-chloro-2-(2-methyl-1,3-dioxolan-2-yl)acetate.* — Ethyl 2-(2-methyl-1,3-dioxolan-2-yl)acetate was prepared by reacting ethyl acetoacetate with ethylene glycol by the method of Salmi (Ber., 1938, 71, 1803).

Ethyl 2-(2-methyl - 1,3 - dioxolan-2-yl)acetate (34.8 p.b.w.) was cooled in ice and sulphuryl chloride (16.5 p.b.w.) was added dropwise, the temperature being kept below 10° C. Cooling was stopped and after half an hour the mixture was distilled to give the product (25 p.b.w.), B.P. 120° C./torr. Index of refraction ($n_D^{19}$) 1.4517. The infra-red spectrum was identical with that of the product obtained from ethylene glycol and ethyl 2-chloro-acetoacetate as prepared in Example I.

EXAMPLE IV

*Preparation of methyl 2-chloro-2-(2-methyl-1,3-dioxolan-2-yl)acetate.*—Methyl 2 - chloro - acetoacetate (15 p.b.w.) with ethylene glycol (12.4 p.b.w.), toluene p-sulphonic acid (0.05 p.b.w.) and toluene (25 p.b.v.) were boiled together under a Dean Stark separator until water ceased to condense. The mixture was washed with aqueous sodium hydrogen carbonate, dried over magnesium sulphate, and distilled to give the product (13.2 p.b.w.) as a colourless oil, B.P. 112°–115° C./8 torr; index of refraction ($n_D^{19}$) 1.4562.

I claim as my invention:

1. The ester of the formula:

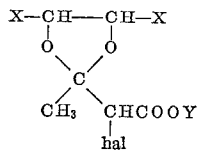

wherein X is a member of the group consisting of hydrogen and alkyl of 1 to 10 carbon atoms, hal is selected from the group consisting of chlorine and bromine and Y is alkyl of 1 to 10 carbon atoms.

2. The ester according to claim 1 wherein hal is chlorine.

3. The ester according to claim 2 wherein one of X is methyl, the other is hydrogen and Y is alkyl of from 1 to 2 carbon atoms.

4. The ester according to claim 2 wherein both of X is hydrogen and Y is alkyl of from 1 to 2 carbon atoms.

5. Ethyl 2-chloro-2 - (2-methyl-1,3-dioxolan-2-yl)acetate.

6. Methyl 2-chloro-2-(2-methyl-1,3-dioxolan-2-yl)acetate.

7. The amide of the formula:

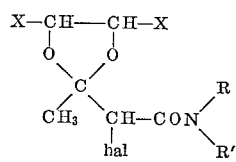

wherein X is a member of the group consisting of hydrogen and alkyl of from 1 to 10 carbon atoms, hal is selected from the group consisting of chlorine and bromine, and R and R' each is a member of the group consisting of hydrogen and alkyl of 1 to 10 carbon atoms.

8. The amide according to claim 7 in which hal is chlorine.

9. The amide according to claim 8 in which one of X is methyl, the other is hydrogen.

10. The amide according to claim 8 in which both of X is hydrogen, R is hydrogen and R' is alkyl of 1 to 4 carbon atoms.

11. The amide according to claim 10 in which both of R and R' is hydrogen.

12. The amide according to claim 10 in which both of R and R' is alkyl of 1 to 4 carbon atoms and X is hydrogen.

13. 2-chloro-2-(2-methyl-1,3-dioxolan-2-yl)acetamide.

14. N-methyl-2-(2-methyl-1,3-dioxolan-2-yl)acetamide.

References Cited

Leutner, Monatshefte for Chemie, vol. 60 (1932), pp. 317–23.

Lucas, Organic Chemistry, 2nd edition, 1953, American Book Co., New York, pp. 215 and 216.

Salmi, Ber., vol. 71 (1938), pp. 1803–1808.

Toan et al., Chemical Abstracts, vol. 58 (1963), col. 3408–3409 (abstract of article from Farmacia (Bucharest), vol. 10, No. 1 (1962), pp. 19–26.

ALEX MAZEL, *Primary Examiner.*

J. H. TURNIPSEED, *Assistant Examiner.*